United States Patent [19]
Ozaki

[11] Patent Number: 5,940,300
[45] Date of Patent: Aug. 17, 1999

[54] METHOD AND APPARATUS FOR ANALYZING A FABRICATION LINE

[75] Inventor: Hiroji Ozaki, Tokyo, Japan

[73] Assignee: Mitsubishi Denki Kabushiki Kaisha, Tokyo, Japan

[21] Appl. No.: 08/854,019

[22] Filed: May 8, 1997

[30] Foreign Application Priority Data

Dec. 12, 1996 [JP] Japan ..................................... 8-332063

[51] Int. Cl.⁶ .............................. G06F 19/00; G06F 7/66
[52] U.S. Cl. ................................ 364/468.28; 364/468.17; 364/468.16; 364/468.22; 438/7; 438/14
[58] Field of Search ....................... 364/468.01, 468.02, 364/468.1, 468.15, 468.17, 468.16, 468.18, 468.24, 468.28, 552, 554, 550, 578, 550.01, 186, 167, 474.04, 149; 438/148, 14, 7, 8–10, 51

[56] References Cited

U.S. PATENT DOCUMENTS

| | | | |
|---|---|---|---|
| 5,111,404 | 5/1992 | Kotani ..................................... | 364/468 |
| 5,219,765 | 6/1993 | Yoshida et al. ............................. | 437/8 |
| 5,240,866 | 8/1993 | Friedman et al. .......................... | 437/8 |
| 5,245,554 | 9/1993 | Tsuyama et al. ........................ | 364/552 |
| 5,341,304 | 8/1994 | Sakamoto et al. ...................... | 364/468 |
| 5,598,341 | 1/1997 | Ling et al. .......................... | 364/468.17 |

FOREIGN PATENT DOCUMENTS

| | | |
|---|---|---|
| 5-35745 | 2/1993 | Japan . |
| 6-348718 | 12/1994 | Japan . |
| 7-335510 | 12/1995 | Japan . |

*Primary Examiner*—William Grant
*Assistant Examiner*—Ramesh Patel
*Attorney, Agent, or Firm*—Oblon, Spivak, McClelland, Maier & Neustadt, P.C.

[57] ABSTRACT

Measurement result data obtained by the devices (A1 to A8) are stored in databases (C1 to C8). Every time new data are entered in any of the databases (C1 to C8), a database monitoring computer (E1) retrieves data related to the entered data from the data stored in the databases (C1 to C8) and stores the retrieved data in a failure analysis database (D3). A data analysis system (D0) gives a readout from the failure analysis database (D3) to an operator. The operator can thereby judge that some nonconforming defect is found and what the cause of nonconforming defect is even while the product wafer is on a fabrication line, to make a prompt remedy against the cause of nonconforming defect. Thus, a method and an apparatus for analyzing a fabrication line can be provided, allowing a prompt remedy against the cause of nonconforming defect.

9 Claims, 15 Drawing Sheets

FIG. 8

| Process Date | ×× × | ×× × | ×× × |
|---|---|---|---|
| Device No. | ×× × | ×× × | ×× × |
| Recipe No. | ×× × | ×× × | ×× × |
| Lot No. | ×× × | ×× × | ×× × |
| Wafer No. | ×× × | ×× × | ×× × |
| Result No. | × | × | × |
| Judgment | × | × | × |
| Distribution Data No. | ×× × | ×× × | ×× × |

FIG. 9

| Process Date | ×× × | ×× × | ×× × |
|---|---|---|---|
| Device No. | ×× × | ×× × | ×× × |
| Recipe No. | ×× × | ×× × | ×× × |
| Lot No. | ×× × | ×× × | ×× × |
| Wafer No. | ×× × | ×× × | ×× × |
| Result No. | × | × | × |
| Judgment | × | × | × |
| Distribution Data No. | ×× × | ×× × | ×× × |
| Process No. | ×× × | ×× × | ×× × |

FIG. 10

| Process Date | ××× | ××× | ××× |
|---|---|---|---|
| Device No. | ××× | ××× | ××× |
| Recipe No. | ××× | ××× | ××× |
| Lot No. | ××× | ××× | ××× |
| Wafer No. | ××× | ××× | ××× |
| Result No. | × | × | × |
| Judgment | × | × | × |
| Process No. | ××× | ×× | ××× |

FIG. 11

| Process Date | ××× | ××× | ××× |
|---|---|---|---|
| Device No. | ××× | ××× | ××× |
| Recipe No. | ××× | ××× | ××× |
| Lot No. | ××× | ××× | ××× |
| Wafer No. | ××× | ××× | ××× |
| Result No. | × | × | × |
| Judgment | × | × | × |
| Process No. | ××× | ××× | ××× |
| Image File Name | ××× | ××× | ××× |

FIG. 12

| Process Date | ××× | ××× | ××× |
|---|---|---|---|
| Device No. | ××× | ××× | ××× |
| Recipe No. | ××× | ××× | ××× |
| Lot No. | ××× | ××× | ××× |
| Wafer No. | ××× | ××× | ××× |
| Result No. | × | × | × |
| Judgment | × | × | × |
| Process No. | ××× | ××× | ××× |
| Measurement Result | ×××.× | ×××.× | ×××.× |

FIG. 13

| Process Date | ××× | ××× | ××× |
|---|---|---|---|
| Device No. | ××× | ××× | ××× |
| Recipe No. | ××× | ××× | ××× |
| Lot No. | ××× | ××× | ××× |
| Wafer No. | ××× | ××× | ××× |
| Result No. | × | × | × |
| Judgment | × | × | × |
| Process No. | ××× | ××× | ××× |
| Measurement Result | ××× | ××× | ××× |

| Device No. | ×× × | ×× × | ×× × |
|---|---|---|---|
| Recipe No. | ×× × | ×× × | ×× × |
| Lot No. | ×× × | ×× × | ×× × |
| Wafer No. | ×× × | ×× × | ×× × |
| Avalysis Result | ×× × | ×× × | ×× × |

METHOD AND APPARATUS FOR ANALYZING A FABRICATION LINE

BACKGROUND OF THE INVENTION

1. Field of the Invention

The present invention relates to a method and an apparatus for analyzing a fabrication line of semiconductor devices.

2. Description of the Background Art

FIG. 18 is a block diagram of a fabrication line analysis apparatus in the background-art. The fabrication line analysis apparatus consists of a data analysis system D90 and data management systems C91 to C98. A fabrication process mainly consists of a wafer process and an inspection process for inspection of the products. The wafer process is carried out by fabrication devices A1 to A4. The inspection process is carried out by an electrical characteristic measuring device A5 and product measuring devices A6 to A8. A fabrication line 10 of semiconductor devices includes the devices A1 to A8. Furthermore, the fabrication process further includes an assembly process which is not shown in this figure.

Inspection systems B1 to B4 each include a contamination inspection device and a defect inspection device (not shown). The data management systems C91 to C94 each include a contamination inspection database and a defect inspection database (not shown).

A product wafer is sequentially processed by the devices A1 to A8. The fabrication devices A1 to A4 are each subjected to a periodical inspection before processing the product wafer. The inspection of the devices A1 to A4 is performed as follows: First, the fabrication device A1 processes a monitor wafer (bare wafer). Next, the contamination inspection device of the inspection system B1 inspects contaminations on the processed monitor wafer and the inspection result is given to the data management system C91 to be entered as data in the contamination inspection database. In like manner, the contamination inspection devices in the inspection systems B2 to B4 inspect contaminations on the monitor wafers processed by the fabrication devices A2 to A4 and the inspection results are given to the data management systems C92 to C94 to be entered as data in the contamination inspection databases, respectively.

The defect inspection devices of the inspection systems B1 to B4 inspect defects on the product wafers processed by the fabrication devices A1 to A4 and the inspection results are given to the data management systems C91 to C94 to be entered as data in the defect inspection databases, respectively.

The assembly process is carried out after the processing by the electrical characteristic measuring device A5 before the processing by the product measuring device A6. The product wafer undergoes the assembly process to be in a form of product.

The electrical characteristic measuring device A5 measures the product wafer and the product measuring devices A6 to A8 each measure the product. The measurement results obtained by the measuring devices A5 to A8 are given to the data management systems C95 to C98 to be entered as data in databases thereof (not shown), respectively.

A database D93 stores the data stored in the data management systems C91 to C98 without any processing. An output unit D92 gives a readout from the database D93.

Since an interconnection process is performed at the end of the wafer process, it is difficult to evaluate the product wafer in detail during the wafer process. Therefore, a detailed evaluation of the product wafer is made after the wafer process.

FIG. 19 is a flow chart showing a background-art procedure of evaluating the product wafer in detail. First, the fabrication devices A1 to A4 process the product wafer (Step 901). Next, the electrical characteristic measuring device A5 measures the electrical characteristics of the product wafer (Step 902). An operator judges whether or not there is any failure (nonconforming defect), observing the measurement result given by the output unit D92 (Step 903). If no failure is found, the product wafer undergoes the assembly process to be in a form of product. Subsequently, the product measuring devices A6 to A8 perform plural types of measurements (Steps 904, 906 and 908). The operator judges whether or not there is any failure, observing the measurement result given by the output unit D92 (Steps 905, 907 and 909). If no failure is found, the process ends, and otherwise the operator analyzes the cause of failure (Step 910). The operator performs an electrical measurement of the defective product (Step 911). Further analysis (Step 912) and a remedy of device, product or product wafer (Step 913) are made. If some failure is found, Step 903 is followed by Steps 912 and 913.

As discussed above, the detailed evaluation of the product wafer is made after the wafer process, and accordingly detecting the cause of nonconforming defect and the like is a time-consuming work and a prompt remedy is hard to do.

Furthermore, even if some nonconforming defect is found during the contamination inspection or the defect inspection, it takes much time to find the cause and it is hard to make a prompt remedy.

SUMMARY OF THE INVENTION

The present invention is directed to a method for analyzing a fabrication line. According to a first aspect of the present invention, the method for analyzing a fabrication line comprises the steps of: (a) storing condition-result data including processing result data and processing condition data into a database when an object is processed by a processing device in a fabrication line; (b) retrieving related condition-result data from the condition-result data accumulated in the database through repeated performances of the step (a) when a processing of an object is performed by the processing device in the fabrication line, the related condition-result data having the same condition as the processing; and (c) analyzing the processing device in the fabrication line or the object on the basis of the related condition-result data retrieved in the step (b).

According to a second aspect of the present invention, in the method of the first aspect, the processing result data include numerical data on distribution of contaminations or defects found in the object which is processed in a wafer process.

According to a third aspect of the present invention, in the method of the second aspect, the step (c) includes the step of analyzing a cause of nonconforming defect according to a trend of the number of defects with respect to processing date obtained from the related condition-result data retrieved in the step (b) if the defect is found nonconforming as a result of the processing performed by the processing device.

According to a fourth aspect of the present invention, the method of the first aspect further comprises the step of storing the condition-result data including image data and the processing condition data on the object which is processed into the database when the object is processed by the processing device in the fabrication line.

According to a fifth aspect of the present invention, the method of the first aspect further comprises the step of transmitting the related condition-result data retrieved in the step (b) through LAN.

The present invention is also directed to an apparatus for analyzing a fabrication line. According to a sixth aspect of the present invention, the apparatus for analyzing a fabrication line comprises a database for storing condition-result data including processing result data and processing condition data when an object is processed by a processing device in a fabrication line; a retrieval portion for retrieving related condition-result data from the condition-result data accumulated in the database when a processing of the object is performed by the processing device in the fabrication line, the related condition-result data having the same condition as the processing; and an analysis portion for analyzing the processing device in the fabrication line or the object on the basis of the related condition-result data retrieved by the retrieval portion.

According to a seventh aspect of the present invention, in the apparatus of the sixth aspect, the processing result data include numerical data on distribution of contaminations or defects found in the object which is processed in a wafer process.

According to an eighth aspect of the present invention, in the apparatus of the seventh aspect, the analysis portion analyzes a cause of nonconforming defect according to a trend of the number of defects with respect to processing date obtained from the related condition-result data retrieved by the retrieval portion if the defect is found nonconforming as a result of the processing performed by the processing device.

According to a ninth aspect of the present invention, the apparatus of the sixth aspect further comprises: a transmission portion for transmitting the related condition-result data retrieved by the retrieval portion through LAN.

The method of the first aspect of the present invention, in which the related condition-result data having the same condition as the present wafer process are retrieved from the condition-result data accumulated in the database, makes it easier to analyze the processing device and the object which is processed in the fabrication line, thereby ensuring a prompt remedy of the device and the object.

The method of the second aspect effectively enables analysis of the object which is processed or the processing device even during the wafer process.

The method of the third aspect effectively enables a judgment on whether the source of nonconforming defect lies in the object which is processed or the processing device.

The method of the fourth aspect effectively enables a more detailed analysis of the object which is processed or the processing device by using images.

The method of the fifth aspect effectively makes it possible to promptly reflect the analyzed result by transmitting the related condition-result data which is retrieved through LAN.

The apparatus of the sixth aspect of the present invention, in which the related condition-result data having the same condition as the present wafer process are retrieved from the condition-result data accumulated in the database, makes it easier to analyze the processing device and the object which is processed in the fabrication line, thereby ensuring a prompt remedy of the device and the object.

The apparatus of the seventh aspect effectively enables analysis of the object which is processed or the processing device even in the wafer process.

The apparatus of the eighth aspect effectively enables a judgment on whether the source of nonconforming defect lies in the object which is processed or the processing device.

The apparatus of the ninth aspect effectively makes it possible to promptly reflect the analyzed result since it comprises the transmission portion.

An object of the present invention is to provide a method and an apparatus for analyzing a fabrication line allowing a prompt remedy against nonconforming defects.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a diagram showing a data structure of an exemplary contamination inspection database;

FIG. 9 is a diagram showing a data structure of an exemplary defect inspection database;

FIG. 10 is a diagram showing a data structure of an exemplary size-error database;

FIG. 11 is a diagram showing a data structure of an exemplary image database;

FIG. 12 is a diagram showing a data structure of an exemplary electrical characteristic database;

FIG. 13 is a diagram showing a data structure of an exemplary product characteristic database;

DESCRIPTION OF THE PREFERRED EMBODIMENTS

Figure 1:
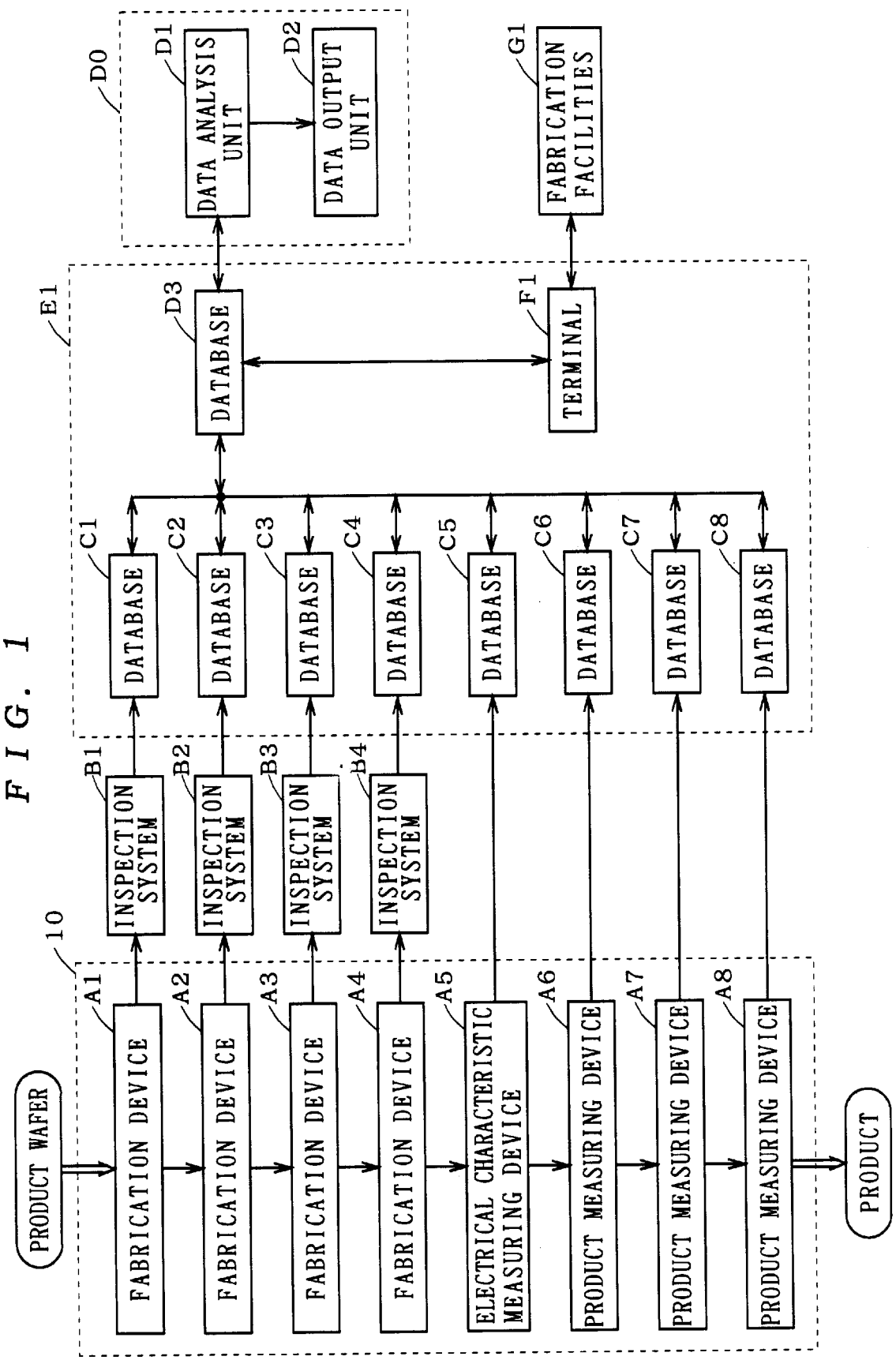
FIG. 1 is a block diagram showing an example of a fabrication line analysis apparatus in accordance with a first preferred embodiment of the present invention.

FIG. 1 is a block diagram showing an example of a fabrication line analysis apparatus in accordance with the first preferred embodiment of the present invention. This figure shows the fabrication devices A1 to A4, the electrical characteristic measuring device A5, the product measuring devises A6 to A8, the inspection systems B1 to B4, a database monitoring computer E1 (retrieval portion), a data analysis system D0 (analysis portion) and fabrication facilities G1 on a remote site. The database monitoring computer E1 includes a failure analysis database D3 and a terminal F1 (transmitter portion). The data analysis system D0 includes a data analysis unit D1 for editing data stored in the failure analysis database D3 and a data output unit D2 for giving a readout of analysis result. The data analysis system D0 and the database monitoring computer E1 constitute a fabrication line analysis apparatus. The devices A1 to A8 are processing devices which process an object.

The fabrication line 10 of semiconductor devices includes the devices A1 to A8. The fabrication devices A1 to A4 are, for example, a CVD device, an ion implantation device, an etching device and a cleaning device. The electrical characteristic measuring device A5 is a prober. The product measuring devices A6 to A8 are testers.

Figure 2:
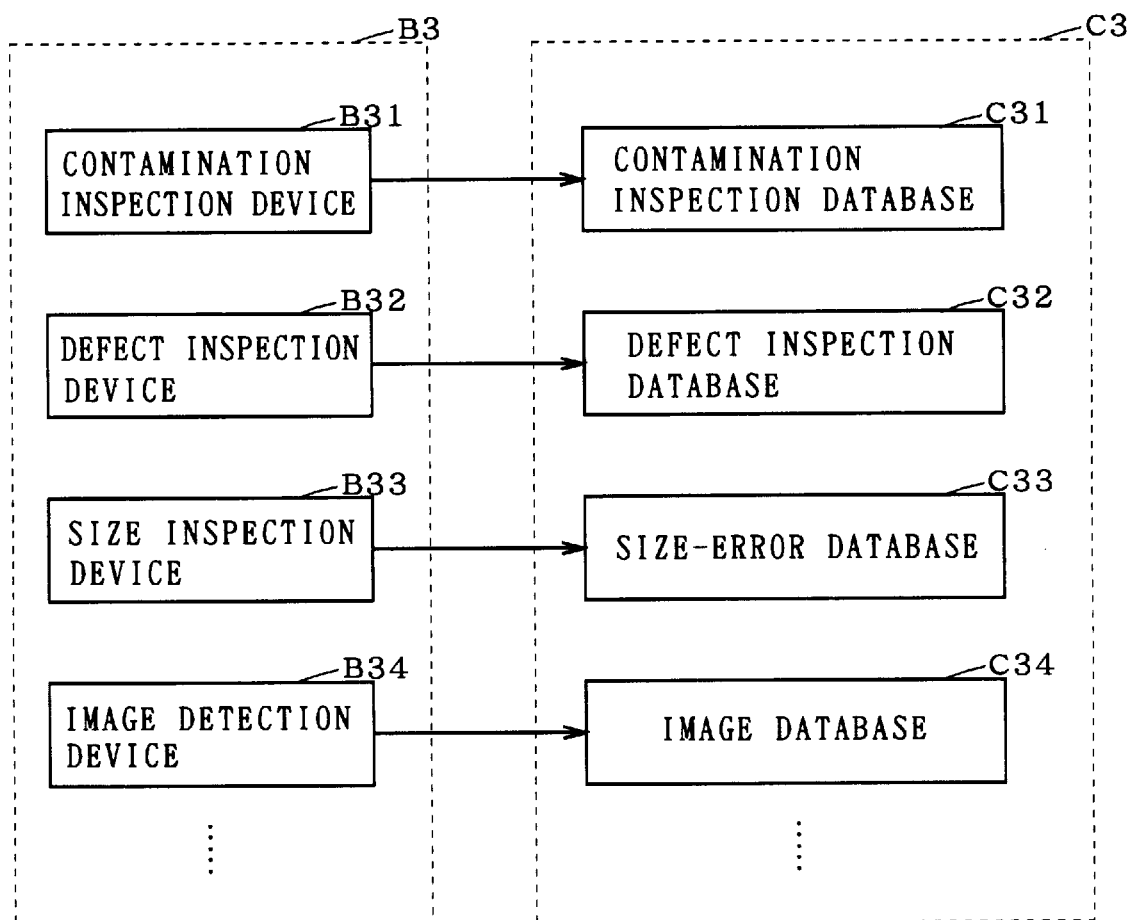
FIG. 2 is a block diagram showing internal structures of an inspection system B3 and a database C3 which are connected to a fabrication device A3 of FIG. 1.

FIG. 2 is a block diagram showing internal structures of the inspection system B3 connected to the fabrication device A3 and the database C3 connected to the inspection system B3 of FIG. 1. The inspection system B3 includes a contamination inspection device B31, a defect inspection device B32, a size inspection device B33, an image detection device B34. The database C3 includes a contamination inspection database C31, a defect inspection database C32, a size-error database C33, an image database C34, which stores data detected by the devices B31 to B34, respectively. The same applies to the inspection systems B1, B2 and B4 and the databases C1, C2 and C4.

Figure 3:
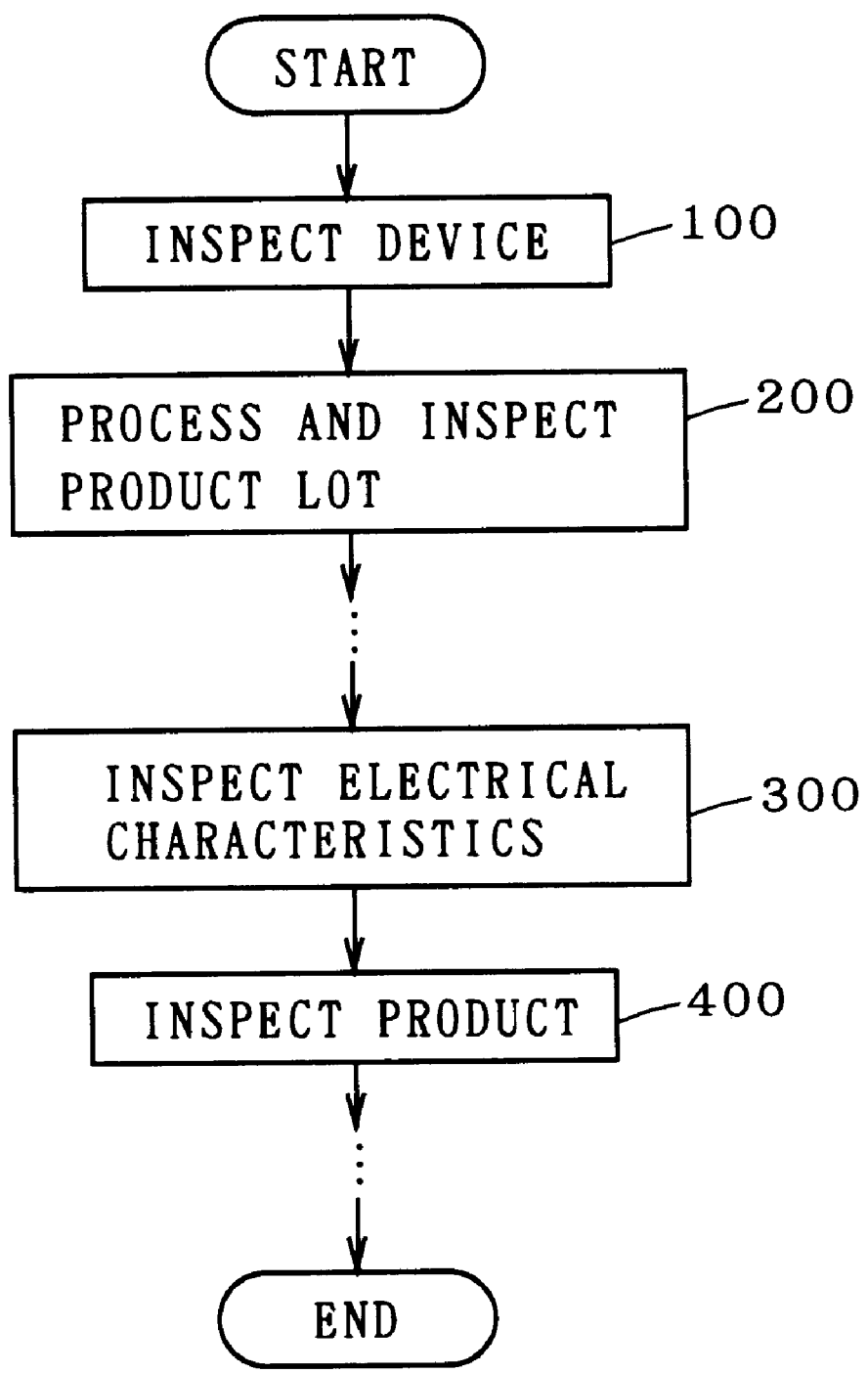
FIG. 3 is a flow chart showing a main process of a fabrication line 10 of semiconductor devices of FIG. 1.

FIG. 3 is a flow chart showing a main process of the fabrication line 10 of semiconductor devices of FIG. 1. First, the fabrication device A1 is subjected to an inspection (Step 100) before processing the product wafer. Next, the fabrication device A1 processes the product wafer. The product wafer processed by the fabrication device A1 is subjected to an inspection (Step 200). After that, Steps 100 and 200 are repeated the number of times corresponding to the number of fabrication devices. Furthermore, Step 100 may be performed periodically. Next, the product wafer processed by the fabrication devices A1 to A4 is inspected by measuring its electrical characteristics (Step 300). Subsequently, the product wafer undergoes the assembly process to be in a form of product. The product is inspected by measuring its electrical characteristics (Step 400). The product wafer, the product, the monitor wafer and the like are objects to be processed in the fabrication line 10. After that, the fabrication measuring devices A7 and A8 also perform Step 400. Detailed discussion on Steps 100, 200, 300 and 400 will be presented below.

Figure 4:
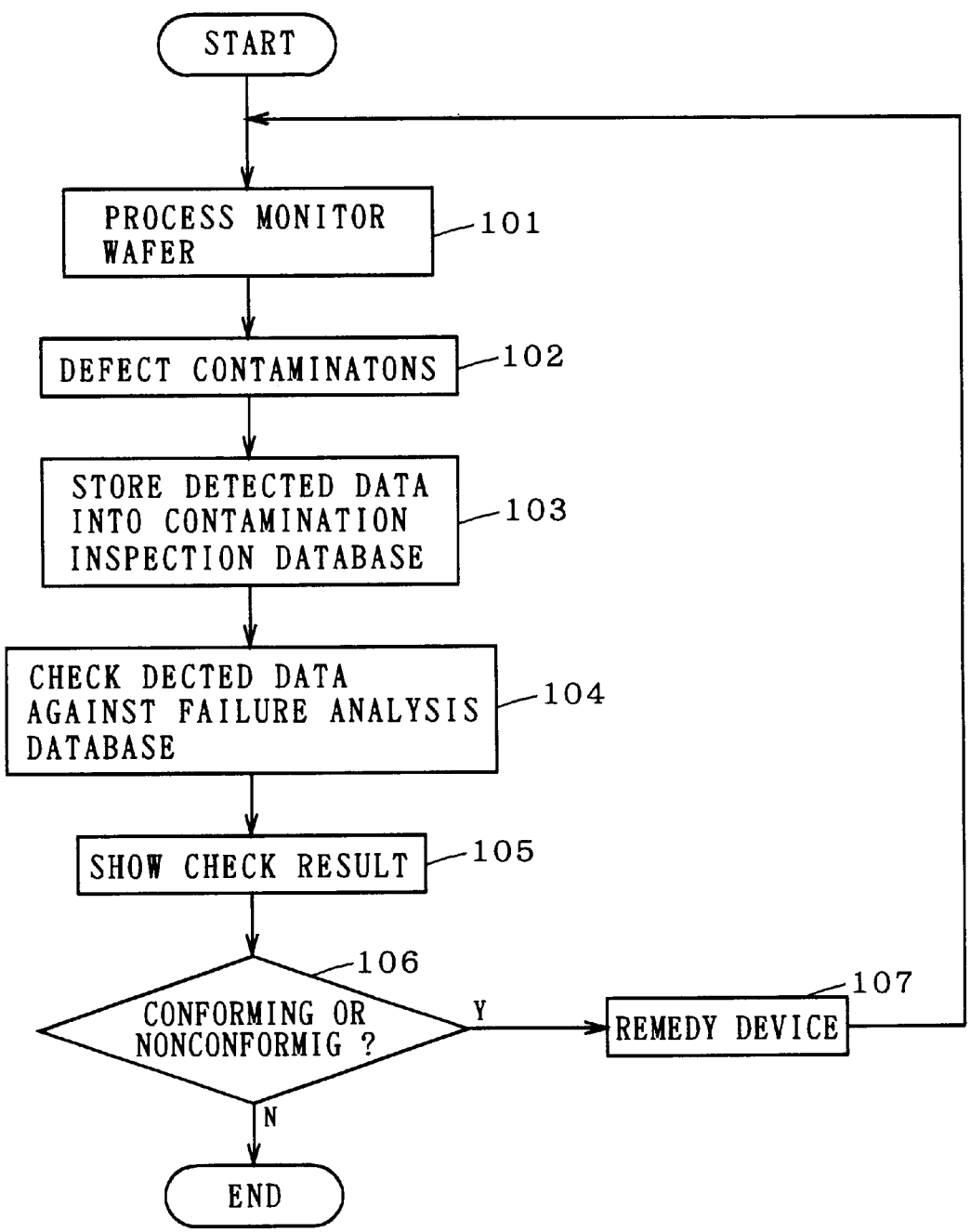
FIG. 4 is a detailed flow chart showing Step 100 of FIG. 3.
Figure 16:
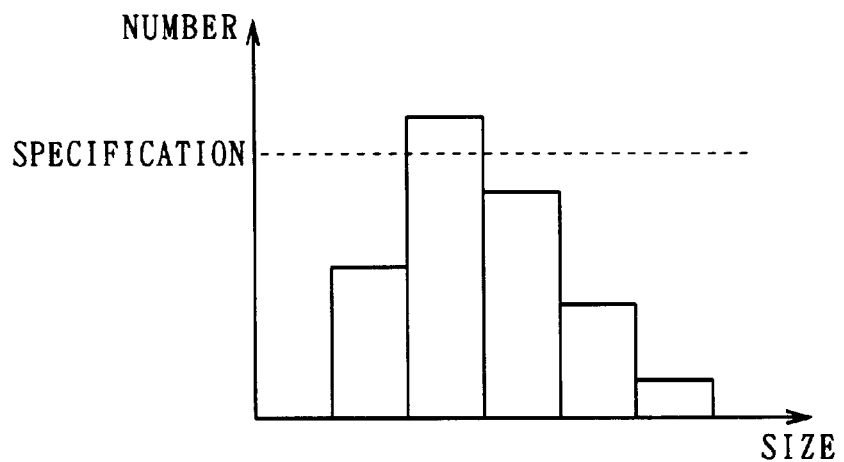
FIG. 16 is a histogram showing a relation between contaminations or defects and the number thereof.

FIG. 4 is a detailed flow chart showing Step 100 of FIG. 3. The same process of Step 100 as below applies to each of the fabrication devices A1 to A4. First, the fabrication device processes the monitor wafer (Step 101). Next, the contamination inspection device detects distribution of contaminations deposited on the processed monitor wafer as data (Step 102). Specifically, to obtain the distribution of contaminations as data, it is necessary to detect the number of contaminations in each of divided areas A to D of a wafer 10a shown in FIG. 15. In more detail, it is necessary to detect the number of contaminations per size in a prescribed range, as shown in the histogram of FIG. 16. Subsequently, the database monitoring computer E1 stores the detected data into the contamination inspection database. Further, the computer E1 stores the detected data into the failure analysis database D3 (Step 103) as discussed later. The data analysis unit D1 checks the data detected in Step 102 against the stored data of the failure analysis database D3 (Step 104). Then, the data output unit D2 gives a readout of the check result (Step 105). The data analysis unit D1 makes a judgment on whether the data detected in Step 102 is conforming or nonconforming (Step 106). If nonconforming, the operator makes a further inspection and a remedy of the device (Step 107). If conforming, Step 106 is followed by Step 200.

Figure 5:
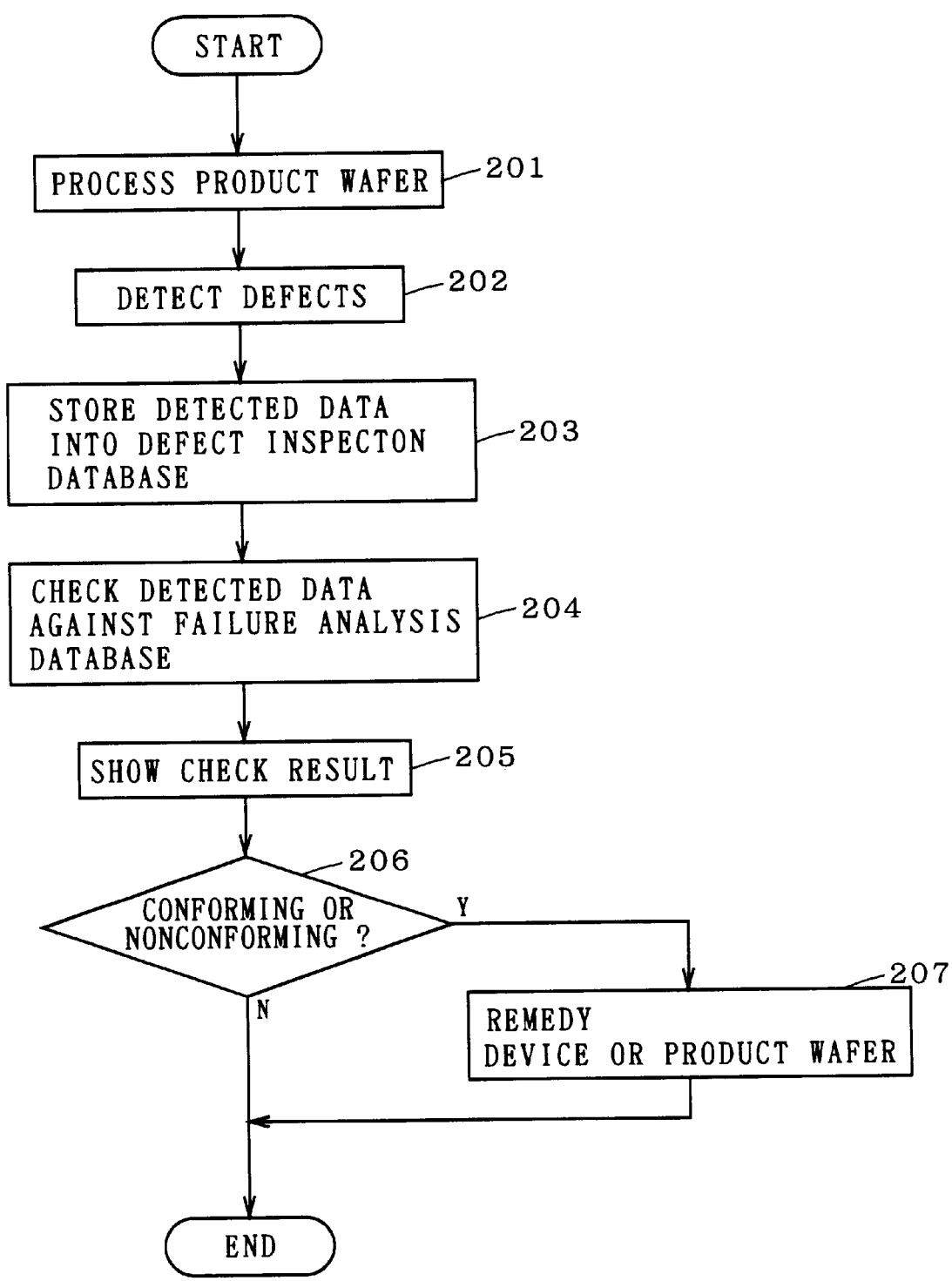
FIG. 5 is a detailed flow chart showing Step 200 of FIG. 3.

FIG. 5 is a detailed flow chart showing Step 200 of FIG. 3. The same process of Step 200 as below applies to each of the fabrication devices A1 to A4. First, the fabrication device processes the product wafer (Step 201). Next, the defect inspection device detects distribution of defects deposited on the processed product wafer as data (Step 202). Specifically, to obtain the distribution of defects as data, it is necessary to detect the number of defects in each of divided areas A to D of the wafer 10a per size in a prescribed range, as shown in FIG. 16, like in Step 102. Subsequently, the database monitoring computer E1 stores the detected data into the defect inspection database. Further, the computer E1 stores the detected data into the failure analysis database D3 (Step 203) as discussed later. The data analysis unit D1 checks the data detected in Step 202 against the stored data of the failure analysis database D3 (Step 204). Then, the data output unit D2 gives a readout of the check result (Step 205). The data analysis unit D1 makes a judgment on whether the data detected in Step 202 is conforming or nonconforming (Step 206). If nonconforming, the operator makes a further inspection and a remedy of either or both of the device and the product wafer (Step 207). Further, the remedy made in Step 207 is stored in the item "Event" of the defect inspection database as discussed later. If conforming, Step 206 is followed by Step 100 for the next fabrication device.

Like in Step 202, the size inspection device detects a size error of a pattern on the product wafer, an error of film thickness of the pattern and an error in mask alignment, and the detected data are stored into the size-error database. At the same time, the image detection device detects image data of the product wafer and the detected data are stored into the image database. The database monitoring computer E1 has a function of editing the image data, such as filtering function (exposure, focus), a trimming function (for trimming away a given area in the image), a synthesizing function (for synthesizing and arranging the trimmed images). The operator makes a decision to do an image editing or not to do.

Figure 6:
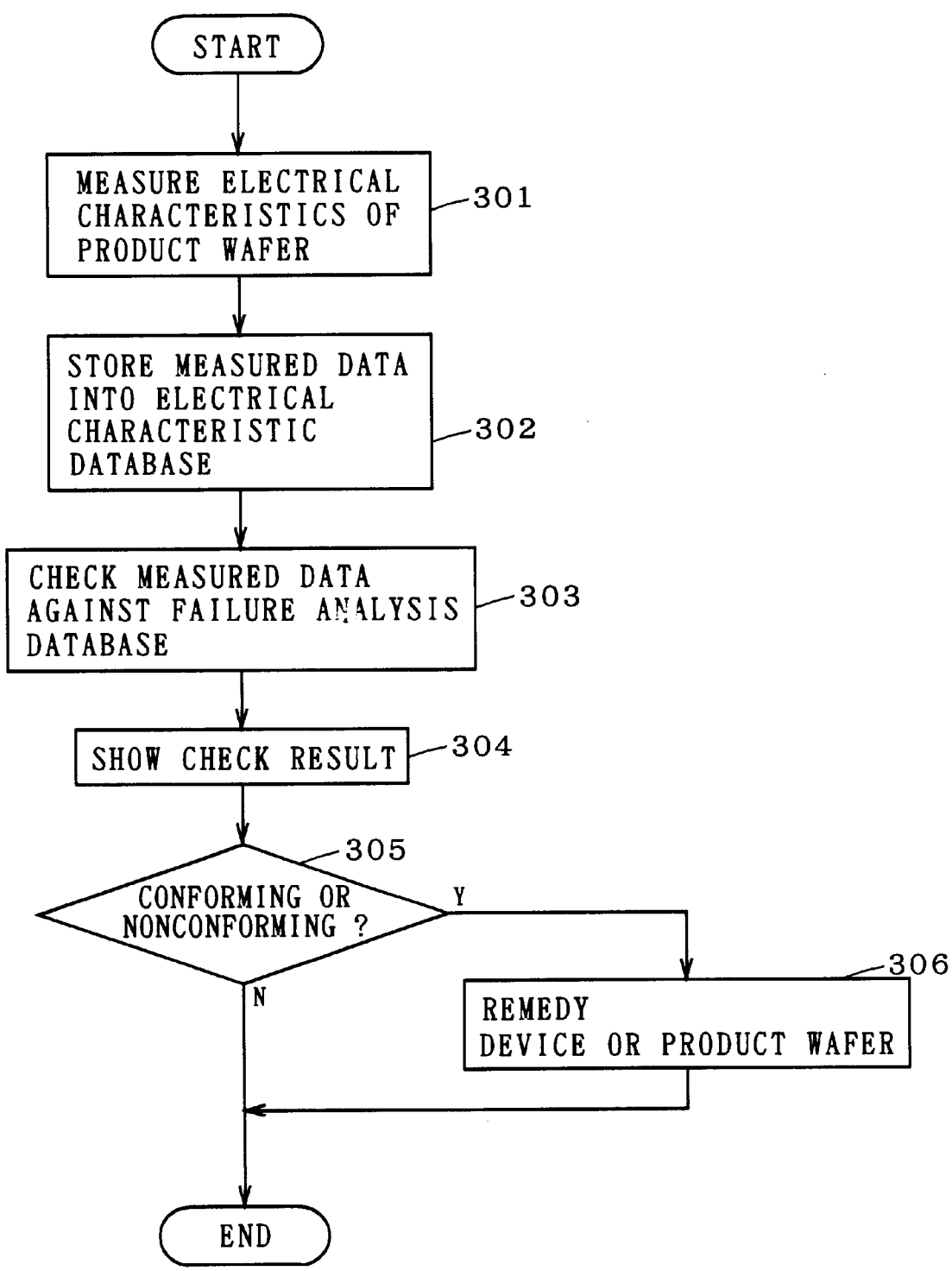
FIG. 6 is a detailed flow chart showing Step 300 of FIG. 3.

FIG. 6 is a detailed flow chart showing Step 300 of FIG. 3. First, the electrical characteristic measuring device AS measures the electrical characteristics of the product wafer (Step 301). Next, the database monitoring computer E1 stores the measured data on electrical characteristics into the electrical characteristic database C5. Further, the computer E1 stores the measured data on electrical characteristics into the failure analysis database D3 (Step 302) as discussed later. The data analysis unit D1 checks the measured data on electrical characteristics obtained in Step 301 against the stored data of the failure analysis database D3 (Step 303). Then, the data output unit D2 gives a readout of the check result (Step 304). The data analysis unit D1 makes a judgment on whether the electrical characteristic data measured in Step 301 is conforming or nonconforming (Step 305). If nonconforming, the operator makes a further inspection and a remedy of either or both of the device and the product wafer (Step 306). If conforming, Step 305 is followed by Step 400 for the product measuring device A6.

Figure 7:
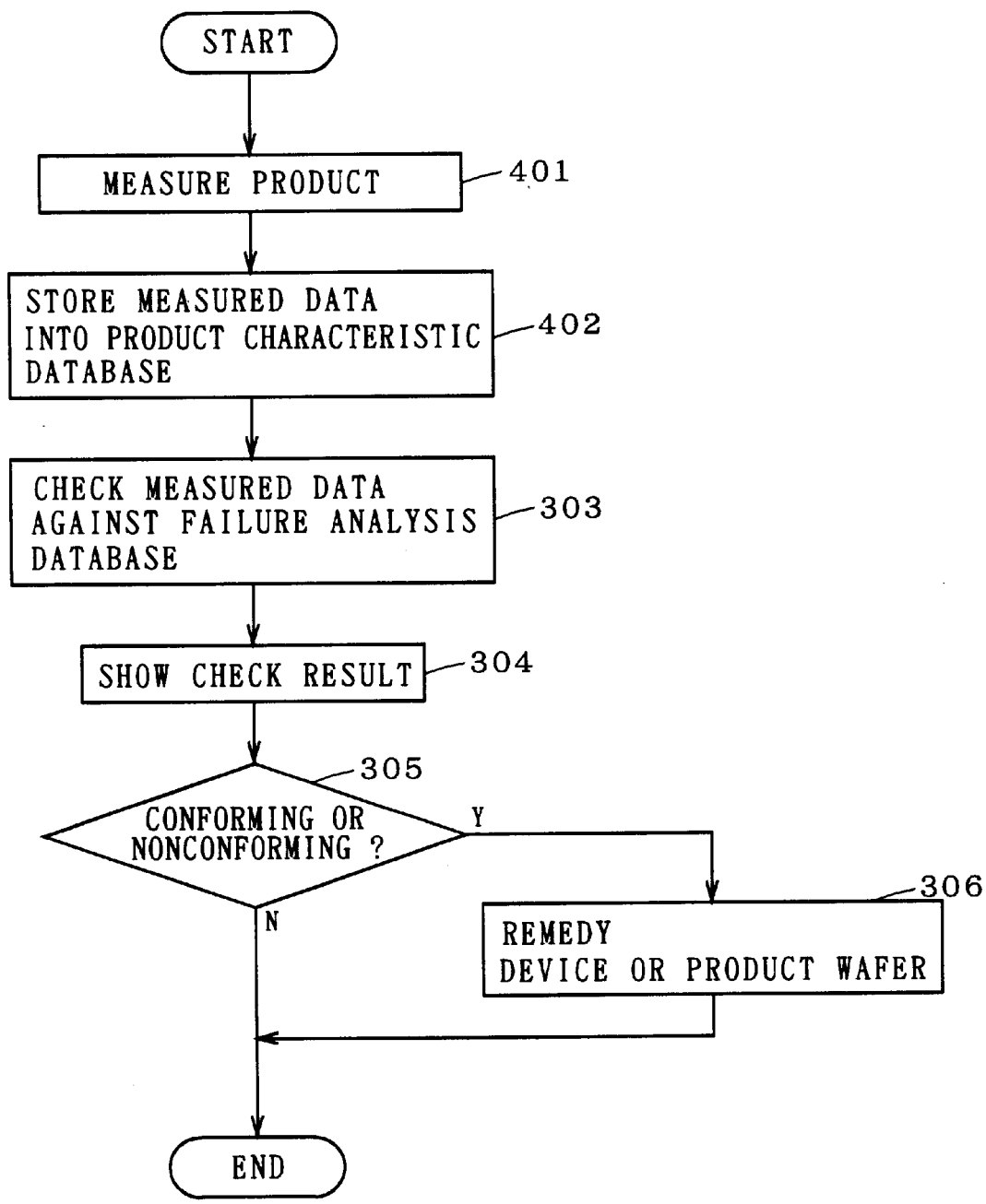
FIG. 7 is a detailed flow chart showing Step 400 of FIG. 3.

FIG. 7 is a detailed flow chart showing Step 400 of FIG. 3. The same process as below applies to each of the product measuring devices A6 to A8. First, the product measuring device measures the data obtained from the product (Step 401). Next, the database monitoring computer E1 stores the measured data into the product characteristic database. Further, the computer E1 stores the measured data into the failure analysis database D3 (Step 402) as discussed later. The data analysis unit D1 checks the data measured in Step 401 against the stored data of the failure analysis database D3 (Step 403). Then, the data output unit D2 gives a readout of the check result (Step 404). The data analysis unit D1 makes a judgment on whether the data measured in Step 401 is conforming or nonconforming (Step 405). If nonconforming, the operator makes a further inspection and a remedy of either or both of the device and the product wafer (Step 406). If conforming, Step 405 is followed by Step 400 for the next product measuring device.

FIG. 8 is a diagram showing a data structure of an exemplary contamination inspection database included in each of the databases C1 to C4. The contamination inspection database has items shown in FIG. 8. The date (year, month and date) and time on which the product wafer is processed is stored at the item "Process Date". The specific sign given to the device is stored at the item "Device No.". The sign indicating the characteristics of the device and parameters to be set is stored at the item "Recipe No.", and the corresponding characteristics of the device are stored in a memory device (not shown) of the database monitoring computer E1. The lot of the ingot is stored at the item "Lot No.", by which a judgment can be made on which ingot the product wafer is made from. The specific sign given to the product wafer is stored at the item "Wafer No." The sign indicating whether the device normally operates or not is stored at the item "Result No.", and the item "Result No." of "1" indicates a normal operation and that of "2" indicates a malfunction. The sign indicating whether the number of contaminations is conforming or nonconforming is stored at the item "Judgment", and the item "Judgment" of "X" indicates nonconforming and that of "○" indicates conforming. The sign indicating data on distribution of contaminations is stored at the item "Distribution Data No.", and the corresponding data are stored in the memory device of the database monitoring computer E1. Column data of the data structure shown in FIG. 8 are termed condition-result data.

FIG. 9 is a diagram showing a data structure of an exemplary defect inspection database included in each of the databases C1 to C4. The defect inspection database has items shown in FIG. 9. The sign indicating whether the number of defects is conforming or nonconforming is stored at the item "Judgment", and the item "Judgment" of "X" indicates nonconforming and that of "○" indicates conforming. The sign indicating what the process is, e.g., an interconnection process using aluminum wires and a process for doping an impurity, is stored at the item "Process No." The sign indicating data on distribution of defects, like contaminations, is stored at the item "Distribution Data No.", and the corresponding data are stored in the memory device of the database monitoring computer E1. Other items are identical to those of FIG. 8.

FIG. 10 is a diagram showing a data structure of an exemplary size-error database included in each of the databases C1 to C4. The size-error database has items shown in FIG. 10. The sign indicating whether the degree of size error is conforming or nonconforming is stored at the item "Judgment", and the item "Judgment" of "X" indicates nonconforming and that of "○" indicates conforming. Other items are identical to those of FIG. 9.

FIG. 11 is a diagram showing a data structure of an exemplary image database included in each of the databases C1 to C4. The image database has items shown in FIG. 11. The sign indicating whether the image includes some nonconforming defect or not is stored at the item "Judgment", and the item "Judgment" of "X" indicates some nonconforming defect and that of "○" indicates no nonconforming defect. The file name of the image data of the product wafer detected by the image detection device is stored at the item "Image File Name", and the corresponding file is stored in the memory device of the database monitoring computer E1. Further, the file name includes a directory name. Other items are identical to those of FIG. 9. If there are a plurality of image files obtained with respect to one product wafer, each of the image files has corresponding condition-result data.

FIG. 12 is a diagram showing a data structure of an exemplary electrical characteristic database C5. The electrical characteristic database has items shown in FIG. 12. The sign indicating whether the electrical characteristics measured by the electrical characteristic measuring device A5 are conforming or nonconforming is stored at the item "Judgment", and the item "Judgment" of "X" indicates nonconforming and that of "○" indicates conforming. The sign indicating data on electrical characteristics is stored at the item "Measurement Result", and the corresponding data are stored in the memory device of the database monitoring computer E1. Other items are identical to those of FIG. 9. If there are plural sorts (summaries) of data on measured electrical characteristics of one product wafer, each of the summaries has corresponding condition-result data. In this case, additional items "Summary" storing the summary of the condition-result data, "Category" storing the category of the data are provided, and if there are a plurality of data for one electrical characteristic, further items "Mean Value", "Distributed Value", "Maximum Value", "Minimum Value" and "The Number of Valid Data" are provided in the electrical characteristic database C5.

FIG. 13 is a diagram showing a data structure of an example of the product characteristic databases C6 to C8. The product characteristic database has items shown in FIG. 13. The sign indicating whether the characteristics measured by the product characteristic measuring device are conforming or nonconforming is stored at the item "Judgment", and the item "Judgment" of "X" indicates nonconforming and that of "○" indicates conforming. The sign indicating data on characteristics is stored at the item "Measurement Result", and the corresponding data are stored in the memory device of the database monitoring computer E1. Other items are identical to those of FIG. 9. If there are plural sorts (summaries) of data on characteristics, each of the summaries has corresponding condition-result data. The sorts of characteristics include threshold value of transistor, breakdown voltage, wire resistance, contact resistance, leak current. In this case, additional items "Summary" storing the summary of the condition-result data, "Category" storing the category of the data and "Minor Total" of bit values if the characteristic is represented by bit value are provided. Further, an item "Yield" storing the yield of a conforming item (which ensures a normal operation) obtained from one product wafer immediately before the product goes out from the fabrication line 10 is provided in the product characteristic database.

Figures 14, 15:
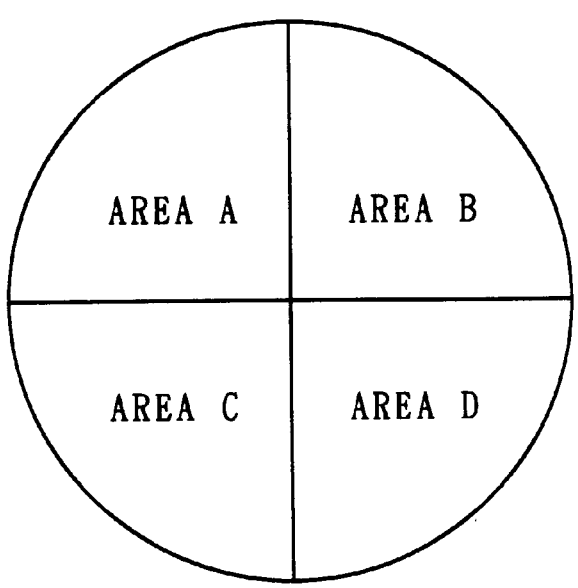
FIG. 14 is a diagram showing a data structure of an exemplary failure analysis database.
FIG. 15 is a view showing divided areas A to D of a wafer.

Thus, the respective condition-result data stored in the databases C1 to C8 have common items (processing condition data). The database monitoring computer E1 retrieves the condition-result data (related condition-result data) having the same contents (processing result data) of given items in the databases C1 to C8, and links the contents of the retrieved condition-result data to obtain an analysis result. The computer E1 stores the condition-result data consisting of the given items and the item "Analysis Result" into the failure analysis database D3. FIG. 14 is a diagram showing a data structure of an exemplary failure analysis database D3. This figure shows the items by which the retrieval is performed and the item "Analysis Result". The sign indicating the analysis result is stored at the item "Analysis Result", and the corresponding analysis result is stored in the memory device of the database monitoring computer E1. Other than items shown in FIG. 14, items "Summary" storing the sort (summary) of the analysis result and "Category" storing the category of the analysis result may be added.

The terminal F1 is connected to the fabrication facilities G1 through LAN and the contents of the failure analysis database D3 are transmitted to the fabrication facilities G1 which fabricate product wafers. For example, if the product wafer has a source of nonconforming defect, giving the contents of the failure analysis database D3 to the fabrication facilities G1 facilitates improvement of the product wafer, with recognition of the source of nonconforming defect for the purpose of education. The transmission of the contents of the failure analysis database D3 is performed in, for example, Steps 104, 204, 303 and 403. As the LAN, internet and intranet, for example, are used. The contents of the failure analysis database D3, such as parameters of Lot No., Process No. and Recipe No., are transmitted on browser according to a program (e.g., HTML) made by the operator. The conventional time-consuming transmitting operation is hardly needed. With LAN, there is little time lag for data transmission.

Figure 17:
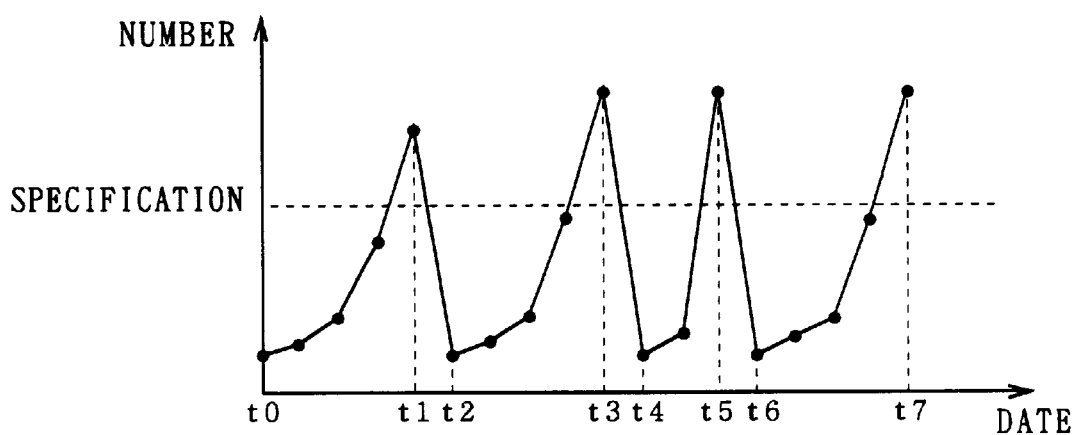
FIG. 17 is a graph showing an example of analysis result.
Figure 18:
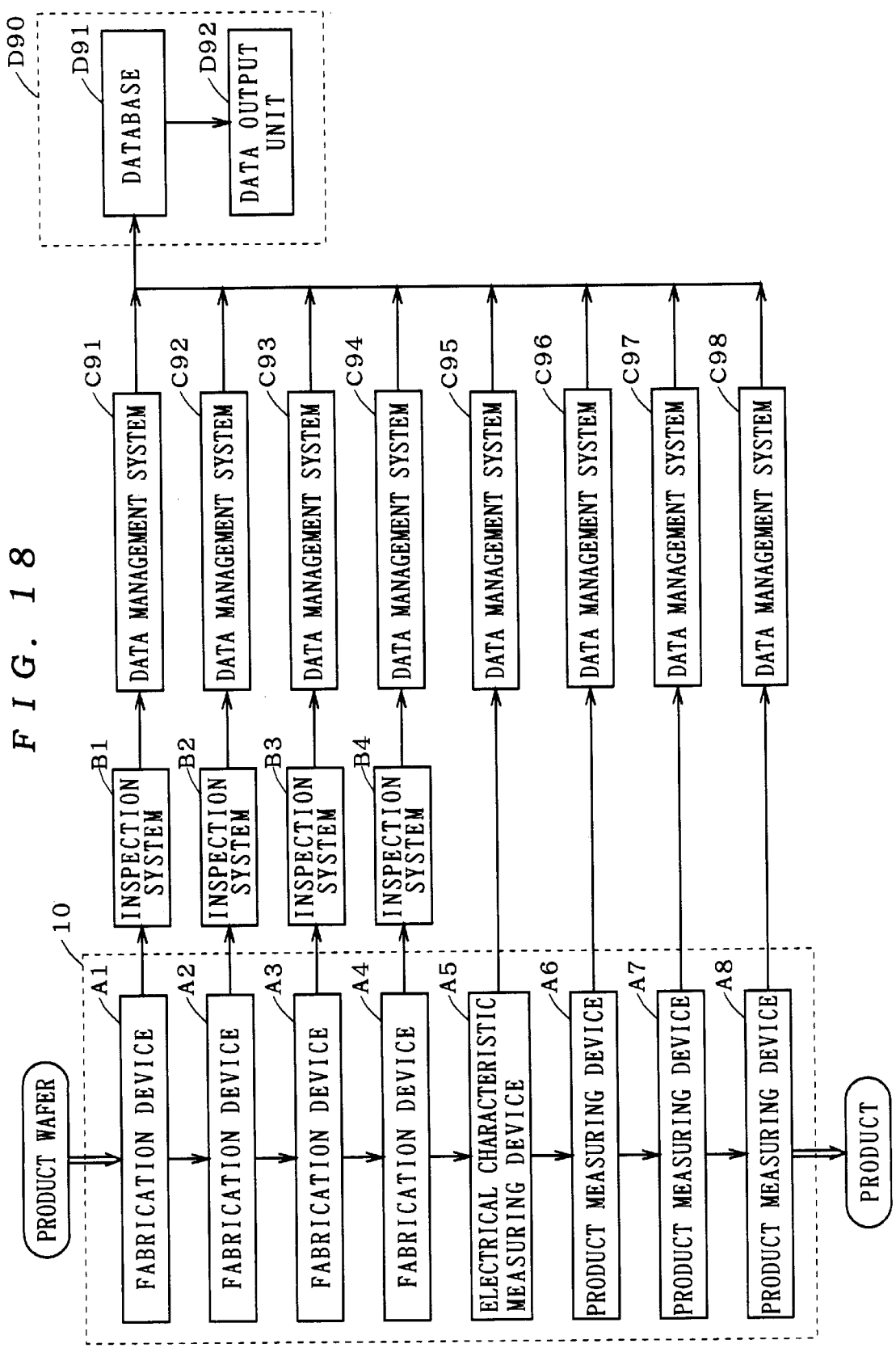
FIG. 18 is a block diagram showing a fabrication line analysis apparatus in the background-art.
Figure 19:
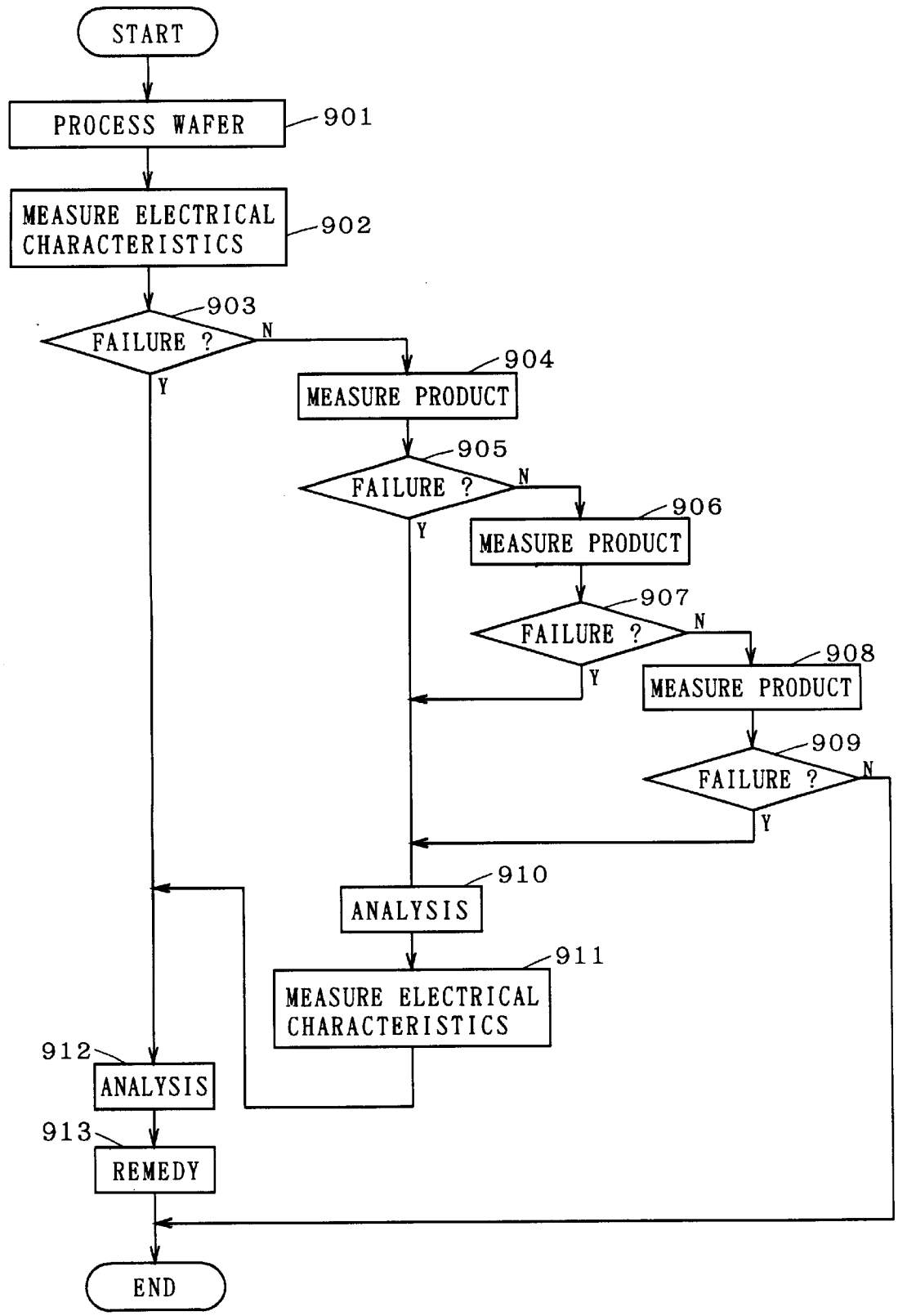
FIG. 19 is a flow chart showing a procedure for improving a process in the background-art.

A specific example of analysis result will be presented. In Step 207 of FIG. 5, as mentioned earlier, when something nonconforming is found, checking either or both of the device and the product wafer is made for remedy. In this step, it is necessary to judge which has the source of nonconforming defect, the device or the product wafer. Then, the database monitoring computer E1 retrieves the condition-result data which has the same content of the item "Device No." as the presently-used device from accumulated condition-result data in the defect inspection database, and stores a trend obtained by linking the content of the item "Process Date" and that of the item "Distribution Data No." (herein, the total number of defects found in the areas A to D of FIG. 15) of the retrieved condition-result data as the analysis result. FIG. 17 is a trend graph of the process date and the total number of defects. It is assumed that the present date is t7 and some nonconforming defect is found at this moment. From this graph, it can be judged that the source of nonconforming defect at date t7 lies in the device because the trend of the period of date t6–t7 resembles those of the periods of date t0–t1 and t2–t3 and the item "Event" at date t1 and t3 of the defect inspection database has a record of a cleaning of the device. On the other hand, the source of the nonconforming defect found at date t5 lies in the product wafer because the item "Event" at date t5 has a record of a change of the product wafer. When a trend different from that at the period of date t0–t1, like the period of date t4–t5, is found later, it can be expected that the source of nonconforming defect lies in the product wafer.

With close relation to the contamination inspection, the data analysis system D0 shows the distribution of the corresponding contaminations on the output unit D2, if required by the operator. Specifically, the data output unit D2 gives a readout of the content of the item "Distribution Data No." at date t7 of the condition-result data retrieved by the items "Device No." and "Wafer No." as shown in FIG. 16.

In Steps 107, 306 and 406, like Step 207, the condition-result data which has the same condition are retrieved from the accumulated condition-result data in the databases C1 to C8, by which a judgment is made on what has the source of nonconforming defect.

With the common items of the condition-result data stored in the databases C1 to C8, a retrieval of the condition-result data having the same condition can be performed from the accumulated condition-result data and a judgment can be made by the retrieved condition-result data on whether something defective lies or not in the device, the product wafer or the product in the fabrication line 10.

Generating the analysis result by the database monitoring computer E1 immediately after entering new data in any of the databases C1 to C8 produces the following advantages. Storing the analysis result in the failure analysis database D3 allows a judgment on the cause of nonconforming defect in consideration of the new data, and therefore it is possible to promptly judge the cause when some nonconforming defect is found.

The database monitoring computer E1 retrieves the condition-result data having the same Lot No. as the product wafer corresponding to the entered data from the accumulated condition-result data, whether conforming or nonconforming, immediately after entering new data in any of the databases C1 to C8 and gives a result information (electrical characteristics, yield) obtained from the retrieved condition-result data regarding the previously-processed product wafer to the operator and the fabrication facilities G1.

Further, a retrieval of the condition-result data is performed in the size-error database and the image database by the items "Device No." and "Wafer No." at date t7, and the retrieved condition-result data are given as a readout, if required by the operator, for judgment on the cause of nonconforming defect. Thus, the retrieval of the related condition-result data allows more detailed analysis of the cause of nonconforming defect.

Furthermore, it is also possible to estimate the ultimate yield of the product wafer presently processed. Specifically, retrieving the condition-result data which has the same condition (e.g., Lot No. and Device No. of the processing device) as the presently-processed product wafer and detecting the yield of the previously-processed product wafer from the retrieved condition-result data allows estimation of the ultimate yield of the presently-processed product wafer. If not so high yield is estimated, a change in lot of the product wafer should be made and a record of lot change is entered in the item "Event". Estimation of category, electrical characteristics and defects on a bit basis, as well as yield, can be made in like manner.

Retrieving the condition-result data by the distribution data "Distribution Data No." regarding contaminations in Step 102 allows a judgment on whether the processing of the product wafer should go on or not and a prediction on possibility of producing a chip with small operational margin notwithstanding contaminations and defects within specifications. That prevents low yield.

Variations

Though FIG. 15 shows the wafer 10a divided into four areas A to D, the wafer 10a may be divided into other than four. Further, the wafer 10a may be concentrically divided or divided with combination of liner lines and concentric circles. The fabrication facilities G1 may include research laboratories or others related to the fabrication line 10. The contamination inspection device and defect inspection device may be included in the same hardware. A data management system including the databases C1 to C8 and another data management system including the failure analysis database D3 may be separately provided, only if data transmission between the two data management systems can be established, while the databases C1 to C8 and the failure analysis database D3 are included in the database monitoring computer E1 in FIG. 1. The data generated by the fabrication devices A1 to A4 may be stored in the databases C1 to C4 respectively, while the data generated by the inspection systems B1 to B4 are stored in the databases C1 to C4 respectively in FIG. 1. As the minimum unit of information in the database, any of lot, wafer, chip and bit may be adopted, and preferably the minimum one among all the units used for the databases C1 to C4 and D3 should be used for all of the databases.

Figure 20:
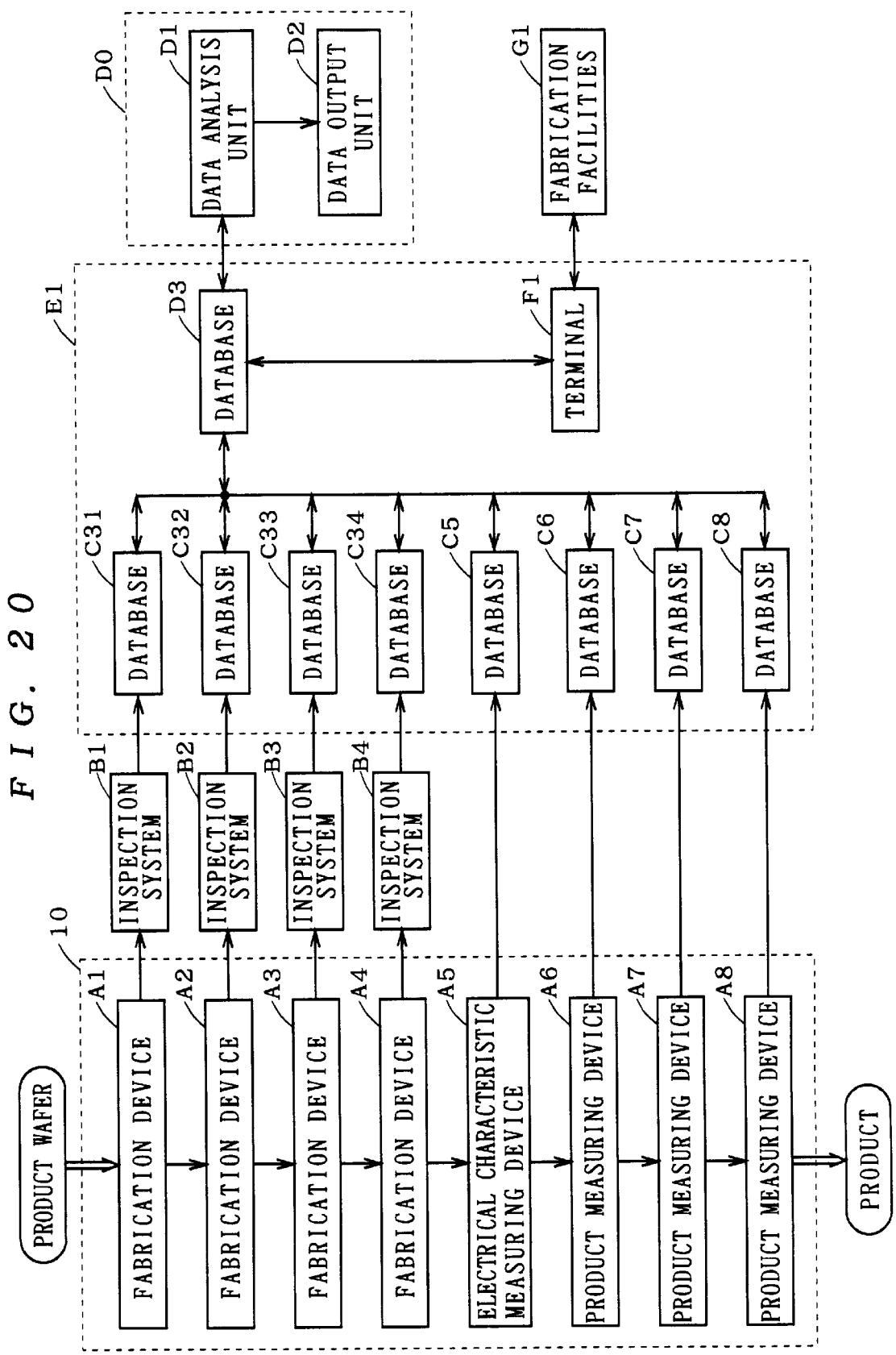
FIG. 20 is a block diagram showing another example of the fabrication line analysis apparatus in accordance with the first preferred embodiment of the present invention.

FIG. 20 is a block diagram showing another example of the fabrication line analysis apparatus in accordance with this preferred embodiment of the present invention. Like components are given the same reference signs as those in FIGS. 1 and 2. While the database monitoring computer E1 of FIG. 1 includes four contamination inspection databases, four defect inspection databases, four size-error databases and four image databases, the database monitoring computer E1 of FIG. 20 includes a contamination inspection database C31, a defect inspection database C32, a size-error database C33 and an image database C34 and the data detected by the contamination inspection device, the defect inspection device, the size inspection device and the image detection device may be stored in the databases C31 to C34, respectively.

While the invention has been shown and described in detail, the foregoing description is in all aspects illustrative and not restrictive. It is therefore understood that numerous modifications and variations can be devised without departing from the scope of the invention.

I claim:

1. A method for analyzing a fabrication line, comprising the steps of:

processing each object of a group of objects using a processing condition provided by a processing device in the fabrication line;

detecting each ongoing processing condition provided for each of the objects being processed by the processing device to provide processing condition data, wherein said processing condition data includes a first specific sign given to said processing device and a second specific sign given to said object;

detecting results of each of the processing conditions applied by the processing device to each of the objects to provide processing result data;

storing the processing condition data and the processing result data into a database for each object processed by the processing device as related condition result data for that processed object;

retrieving the processed object related condition-result data from said database; and analyzing said processing device or any of said processed objects on the basis of said related condition-result data retrieved from said database.

2. The method of claim 1, wherein said detecting and providing of said processing result data includes providing processing result data as numerical data indicating distribution of contaminations or defects in said objects processed in a wafer process by said processing device.

3. The method of claim 2, wherein said analyzing step includes analyzing a cause of a nonconforming defect according to a trend of a number of defects found in each object processed by said processing device.

4. The method of claim 1, wherein the step of storing said related condition-result data includes storing image data in said database provided on each said object processed by said processing device.

5. The method of claim 1, further comprising the step of transmitting said related condition-result data retrieved from said database through LAN.

6. An apparatus for analyzing a fabrication line, comprising:

a database providing portion configured to detect and store related condition-result data including processing result data and processing condition data for each object of a group objects which are processed by a same processing device in the fabrication line, wherein said processing condition data includes a first specific sign given to said processing device and a second specific sign given to said object;

a retrieval portion configured to retrieve related condition-result data from said database; and an analysis portion for analyzing said processing device in said fabrication line or any of said objects on the basis of said related condition-result data retrieved by said retrieval portion.

7. The apparatus of claim 6, wherein said processing result data include numerical data on distribution of contaminations or defects found in each said object which is processed in a wafer process by said processing device.

8. The apparatus of claim 7, wherein said analysis portion analyzes a cause of a nonconforming defect according to a trend of the number of defects found in each said object processed by said processing device.

9. The apparatus of claim 6, further comprising:

a transmission portion configured to transmit said related condition-result data retrieved by said retrieval portion through LAN.

* * * * *